(12) United States Patent
Bayer et al.

(10) Patent No.: US 10,416,987 B2
(45) Date of Patent: Sep. 17, 2019

(54) UPDATING SOFTWARE IN MULTIPLE ADAPTER CARDS

(71) Applicant: INTERNATIONAL BUSINESS MACHINES CORPORATION, Armonk, NY (US)

(72) Inventors: Gerd K. Bayer, Stuttgart (DE); Volker M. Boenisch, Boeblingen (DE); David G. Chapman, Clinton Corners, NY (US); Jakob C. Lang, Tuebingen (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 15/826,759

(22) Filed: Nov. 30, 2017

(65) Prior Publication Data
US 2019/0163462 A1    May 30, 2019

(51) Int. Cl.
| | | |
|---|---|---|
| G06F 8/65 | (2018.01) | |
| G06F 13/28 | (2006.01) | |
| G06F 13/40 | (2006.01) | |
| G06F 13/42 | (2006.01) | |

(52) U.S. Cl.
CPC ............. *G06F 8/65* (2013.01); *G06F 13/28* (2013.01); *G06F 13/4068* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | |
|---|---|---|
| 9,092,297 B2 | 7/2015 | Armstrong et al. |
| 9,298,446 B2 | 3/2016 | Chang et al. |
| 9,619,245 B1 | 4/2017 | Ramanujam |

*Primary Examiner* — Idriss N Alrobaye
*Assistant Examiner* — Dayton Lewis-Taylor
(74) *Attorney, Agent, or Firm* — Cantor Colburn LLP; Noah Sharkan (57) ABSTRACT

A method for updating software in a computer system, comprising at least a central processor and multiple adapter cards, wherein the adapter cards are attached to a network, the method comprising (i) the central processor generating a distribution map based on configuration data of the network (100); (ii) the central processor sending the software update data and the distribution map to a receiving adapter card of the adapter cards; (iii) in response to receiving the software update data and the distribution map, the receiving adapter card applying the received software update data and creating at least one modified distribution map.

20 Claims, 11 Drawing Sheets

UPDATING SOFTWARE IN MULTIPLE ADAPTER CARDS

The present invention relates in general to data processing systems, in particular, to a method for updating software in a computer system, the computer system comprising at least a central processor and multiple adapter cards, wherein the adapter cards are attached to a network. The invention further relates to a computer program product and a data processing system for updating software in a computer system.

BACKGROUND

According to state of the art, methods and structures are known for using a single option Read Only Memory (ROM) image to configure and boot a computer system using one or more converged network adapters or a set of adapters. A converged network adapter card utilizes a single option ROM to support configuring and booting the protocols of the multifunction converged network adapter. In one embodiment the single option ROM stores a sequence of images to support configuring and booting the network interface card (NIC) and storage protocols supported by the converged network adapter (CAN) card and to support all of the boot solutions for the converged network adapter card.

Such methods typically include a system BIOS of a computer system reading a single option ROM associated with a converged network adapter (CNA) card to obtain information for booting and configuration. The single option ROM has a sequence of images to support all of the protocols of the adapters of the CNA, and supports all of the boot solutions for the converged network adapter card. The option ROM image is loaded into memory by the system BIOS, and a call is made to the initialization routine. This routine then scans for all of the adapters present on the system, reads the configuration parameters stored in flash memory on each adapter found, and proceeds to set up preboot execution environment (PXE) bootstrap entry vector (BEV) entries and storage boot connection vector (BCV) entries based on the parameters read. This enables the user to use one adapter present on the system for PXE boot, one for Fiber Channel over Ethernet (FCoE) boot and another for iSCSI boot without actually having separate option ROM images on all of them. This design of one option ROM image serving all adapters present on the system eliminates the effort required to update each adapter with an option ROM image, and reduces the memory footprint as only one option ROM image is loaded into memory, and initialized leaving space for other option ROMs to load and initialize.

SUMMARY

A method is proposed for updating software in a computer system, the computer system comprising at least a central processor and multiple adapter cards, wherein the adapter cards are attached to a network, the method comprising: (i) the central processor generating a distribution map based on configuration data of the network, the distribution map comprising an ordered structure of unique network identifiers of adapter cards that are to be updated with software update data; (ii) the central processor sending the software update data and the distribution map to a receiving adapter card of the adapter cards referenced in the distribution map; (iii) in response to receiving the software update data and the distribution map, the receiving adapter card—applying the received software update data;—creating at least one modified distribution map by removing network identifiers including the identifier of the receiving adapter card from the received distribution map such that the at least one modified distribution map comprises a disjoint subset of network identifiers from the received distribution map;—for the at least one modified distribution map sending the received software update data and the modified distribution map to at least one next adapter card in the modified distribution map.

The network may, for example, be a hierarchical network. Adapter cards may preferably be configured to communicate with each other.

As used herein adapter cards may in particular be represented as PCI cards used in the computer system e.g. for networks or I/O-processes. In PCI card addressing PCI cards are mapped into a physical system address space of the central processor. In a regular operation, e.g., a processor load/store instruction to an address of a device is forwarded into the PCI card through a PCI root-complex. The PCI card issues a DMA load/store instruction to the system memory, which may be potentially virtualized through an I/O memory management unit (IOMMU). In a peer-to-peer operation one PCI card issues a DMA load/store instruction to a system memory address that is mapped to an address space of another PCI card.

As used further herein software may also be understood as embedded in the adapter cards as firmware.

The software update operation is an asynchronous process.

According to an embodiment of the invention, the central processor creates a distribution map (DM) of the adapter cards based on the I/O configuration, including coupling for redundancy. The central processor pushes new firmware and the distribution map to an alternate firmware range of a single adapter card and initiates the software update process on that adapter card only. The updated adapter card informs the parent, which may either be the central processor or another adapter card, about a completion of the software update process. The updated adapter card removes itself from the distribution map and pushes a subset of the distribution map to a next adapter card, e.g. in a branch of a tree structure in the distribution map. Then the updated adapter card updates the firmware on that adapter card directly.

The described method exhibits advantages over current solutions according to state of the art, where software or firmware updates for PCI cards are pushed to each adapter card by the central processor directly, causing a cost intensive consumption of central processor time. The inventive solution offers significant advantages concerning processor time as well as response time for a user.

Further, a favorable computer program product is proposed for updating software in a computer system, the computer system comprising at least a central processor and multiple adapter cards, wherein the adapter cards are attached to a network, the computer program product comprising a computer readable storage medium having program instructions embodied therewith, the program instructions executable by the computer system to cause the computer system to perform a method comprising: (i) the central processor generating a distribution map based on configuration data of the network, the distribution map comprising an ordered structure of unique network identifiers of adapter cards that are to be updated with software update data; (ii) the central processor sending the software update data and the distribution map to a receiving adapter card of the adapter cards referenced in the distribution map;

(iii) in response to receiving the software update data and the distribution map, the receiving adapter card—applying the received software update data; creating at least one modified distribution map by removing network identifiers including the identifier of the receiving adapter card from the received distribution map such that the at least one modified distribution map comprises a disjoint subset of network identifiers from the received distribution map; for the at least one modified distribution map sending the received software update data and the modified distribution map to at least one next adapter card in the modified distribution map.

Further, a data processing system for execution of a data processing program is proposed, comprising computer readable program instructions for performing the method described above.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for updating software in a computer system. The illustrative embodiments may be used for updating software in a computer system, wherein the computer system comprises at least a central processor and multiple adapter cards, that are attached to a network. The illustrative embodiments are sometimes described herein using particular technologies only as an example for the clarity of the description.

Figure 1:
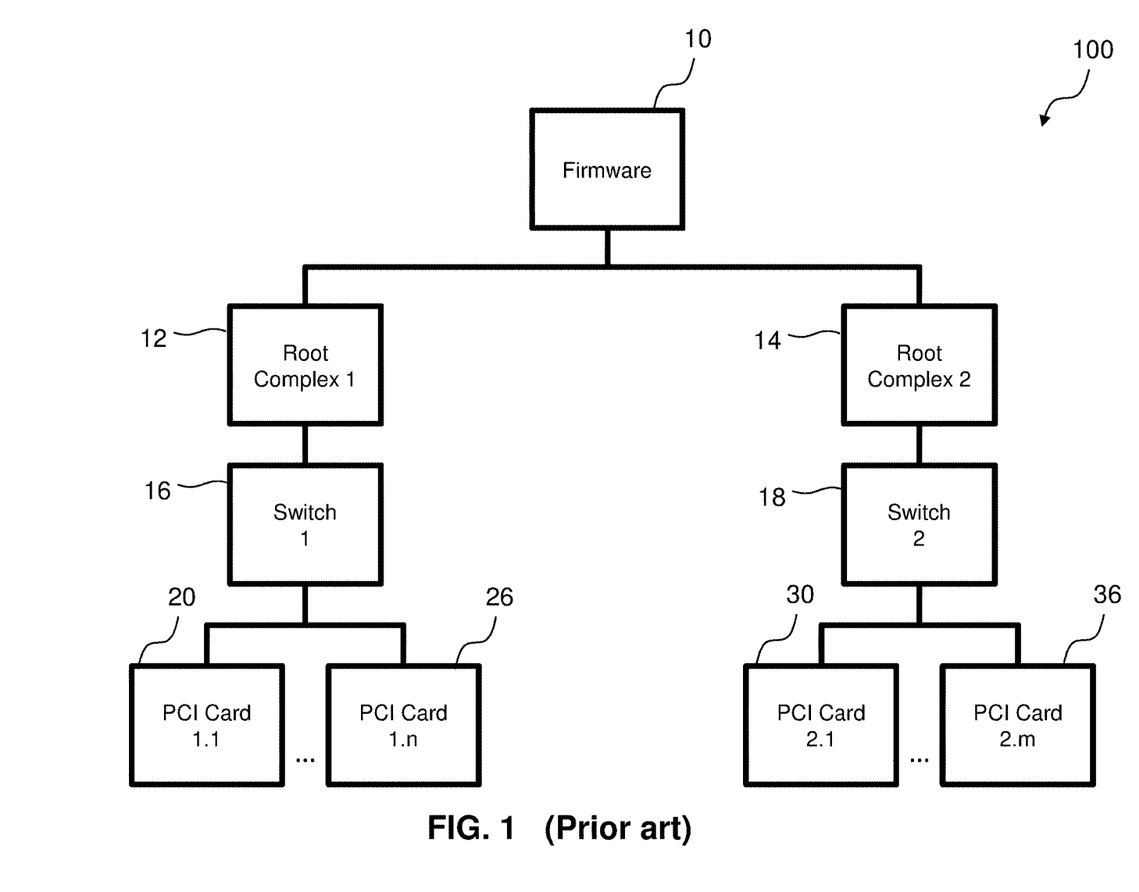
FIG. 1 depicts a setup overview of a tree of a network in a computer system according to state of the art, where PCI cards are provided with a firmware via root complexes through switches.

FIG. 1 depicts a setup overview of a tree of a network 100 in a computer system according to an embodiment of the invention provided with a firmware 10 via root complexes 12, 14 through switches 16, 18. Root complexes 12, 14 are interfaces between a memory and initialisation paths. Each root complex 12, 14 comprises at least one switch 16, 18.

Figure 2:
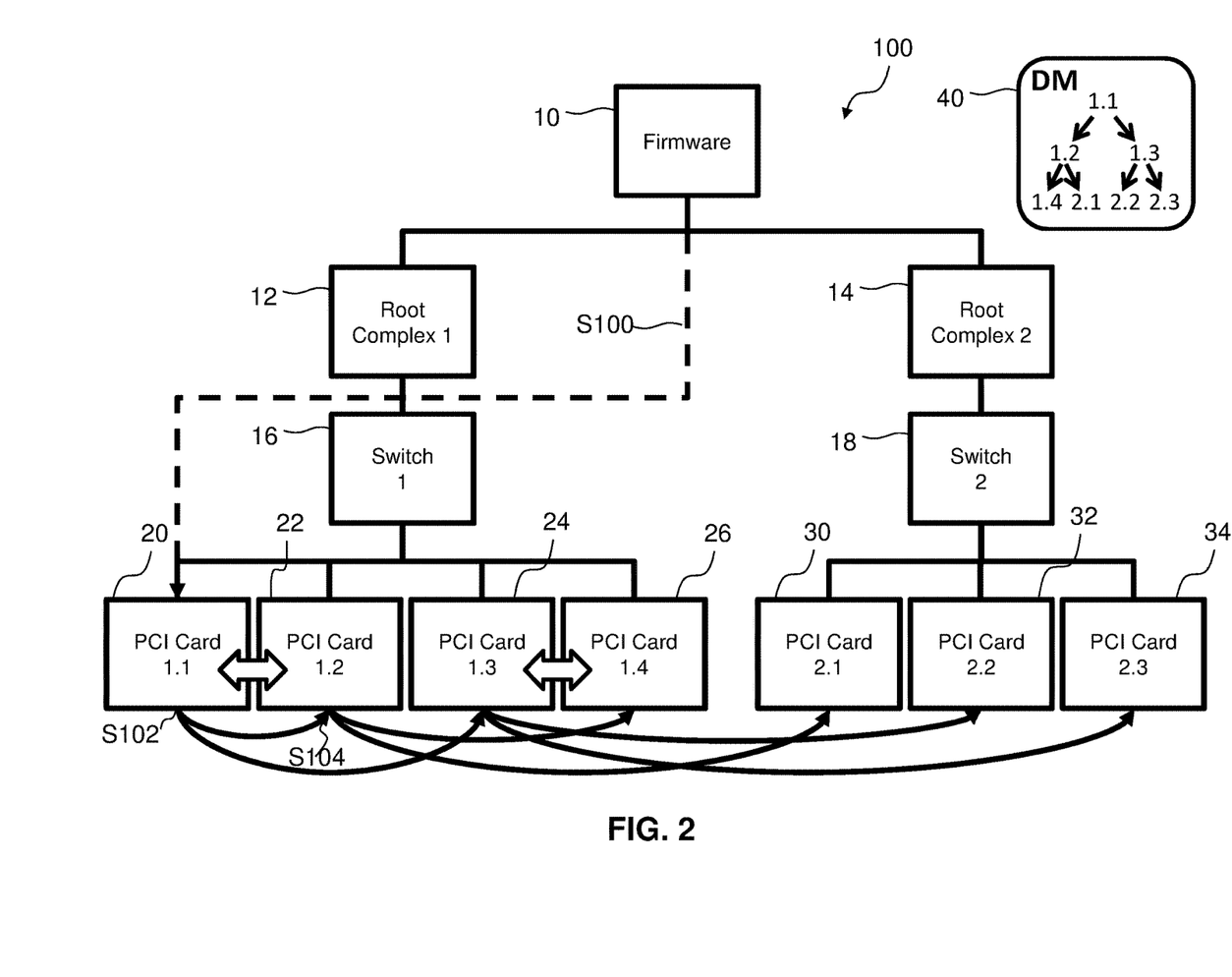
FIG. 2 depicts a setup overview for updating software in PCI cards according to an embodiment of the invention.

In FIG. 2 a setup overview for updating software in PCI cards 20, 22, 24, 26, 30, 32, 34, 36 according to an embodiment of the invention is depicted. A single software update process triggered by the central processor 216 with a distribution map 40 is shown. The software may be implemented in the adapter cards 20, 22, 24, 26, 30, 32, 34, 36 as firmware.

Updating software in a computer system 212 (as shown e.g. in FIG. 16) is described, wherein the computer system 212 comprises at least a central processor 216 and multiple adapter cards 20, 22, 24, 26, 30, 32, 34, 36. The adapter cards 20, 22, 24, 26, 30, 32, 34, 36 may, e.g., be PCI cards and/or IO cards. The adapter cards 20, 22, 24, 26, 30, 32, 34, 36 are attached to a network 100. The method according to an embodiment of the invention comprises (i) generating a distribution map 40 based on configuration data of the network 100 by the central processor 216. This distribution map 40 comprises an ordered structure of unique network identifiers of adapter cards 20, 22, 24, 26, 30, 32, 34, 36 that are to be updated with software update data 70. (ii) The central processor 216 sends the software update data 70 and the distribution map 40 to a receiving adapter card 20 of the adapter cards 20, 22, 24, 26, 30, 32, 34, 36 referenced in the distribution map 40 as depicted by the dashed line S100. In response to receiving the software update data 70 and the distribution map 40, the receiving adapter card 20 applies the received software update data 70. Then at least one modified distribution map 42 is created by removing network identifiers including the identifier of the receiving adapter card 20 from the received distribution map 40. Thus the at least one modified distribution map 42 comprises a disjoint subset of network identifiers from the received distribution map 40. Then the received software update data 70 and the modified distribution map 42 are sent according to the at least one modified distribution map 42 to at least one next adapter card 22, 24 in the modified distribution map 42 in step S102.

The receiving adapter card 20 which receives the software update data 70 and the distribution map 40 sent from the central processor 216 may be the first adapter card 20 of the ordered structure of unique network identifiers of adapter cards 20, 22, 24, 26, 30, 32, 34, 36 to receive the software update in step S100.

The next adapter card 22, 24 in the modified distribution map 42, in response to receiving the software update data 70 and the modified distribution map 42, applies the received software update data 70 in steps S102 and S104, respectively. At least one further modified distribution map 42 is created by removing network identifiers including the identifier of the next adapter card 22, 24 from the received modified distribution map 42. Thus the further modified distribution map 42 comprises a disjoint subset of network identifiers from the received modified distribution map 42.

The received software update data 70 and the modified distribution map 42 are then sent according to the modified distribution map 42 to at least one next adapter card 26, 30, 32, 34 in the modified distribution map 42.

Adapter cards 20 and 22, as well as adapter cards 24 and 26 may be coupled for redundancy, as shown by arrows between the adapter cards 20, 24 and 24, 26, respectively, therefore shall not be updated in parallel.

To summarize the software update process according to the embodiment of the invention, the central processor 216 creates the distribution map 40 (DM) of adapter cards 20 to 36 based on the I/O configuration, including coupling for redundancy. The central processor 216 initiates a communication channel with the PCI card 20 and pushes new software to the first PCI card 20 in the distribution map 40. Then the central processor 216 pushes the distribution map 40 to the first PCI card 20 in the distribution map 40. The central processor 216 initiates the software update process on the first PCI card 20. The update process on the PCI card 20 starts with performing the software update. Then the own identification is removed from the distribution map 40. Subsets of the distribution map 42 are created, e.g. branches of a tree structure of PCI cards. A loop for all subsets 42 is performed with pushing new software to a first PCI card 22, 24 in the subset, followed by pushing the subset of the distribution map 42 to the first PCI card 22, 24 in the subset 42. A software update on that PCI card is directly initiated. At the end update completion is reported to the parent, i.e. the PCI card 20 or the central processor 216.

If memory-mapped I/O (MMIO) is not available, the central processor 216 can trigger each root complex 12, 14 separately.

FIGS. 3, 4, 5, 6, 7, 8, 9, 10, 11 and 12 depict a flow for updating software in a PCI card 20 according to an embodiment of the invention.

Figure 3:
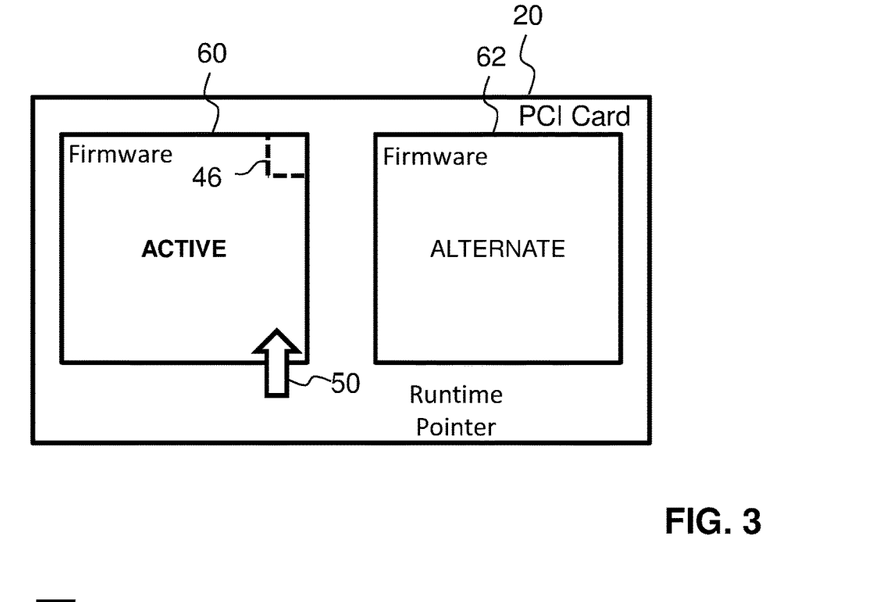
FIG. 3 depicts a flow for updating software in a PCI card according to an embodiment of the invention.

The adapter card 20 comprises at least an active memory area 60 and a reserved memory area 62. The active memory area 60 comprises a memory space 46 for the initiate update flag 48 and the reserved memory area 62 comprises a memory space 44 (shown in FIG. 5) for the distribution map 40. The active memory area 60 is marked by a runtime pointer 50.

An example of the creation of a distribution map 40 may be as follows. The central processor 216 creates an empty distribution map 40 (DM) of adapter cards 20, 22, 24, 26, 30, 32, 34 based on the I/O configuration. The central processor 216 adds a first configured adapter card as "root" for the first iteration (PCI card 20). The central processor 216 assigns the next 2 adapter cards as leaves to the root (PCI cards 22, 24). Then the central processor 216 assigns the next 2 adapter cards as leaves to the first leave (PCI cards 26 and 30). The central processor 216 assigns the next 2 adapter cards as leaves to the second leave (PCI cards 32 and 34).

Figure 4:
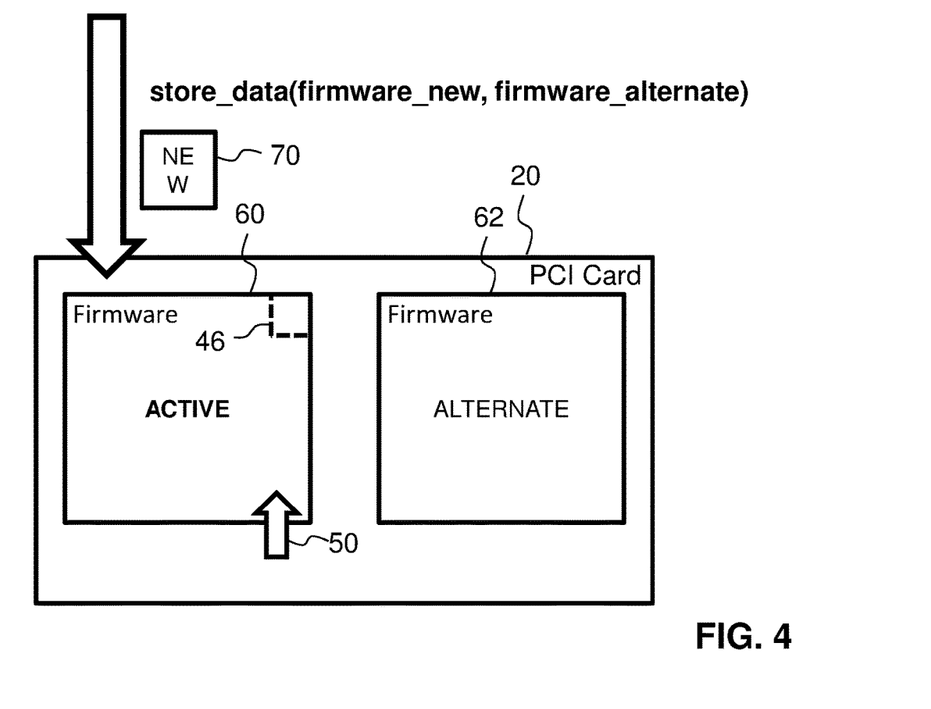
FIG. 4 depicts a flow for updating software in a PCI card according to an embodiment of the invention.

According to the inventive method a new software 70 is loaded to the PCI card 20 by a store_data (firmware_new, firmware_alternate) instruction, as shown in FIG. 4. The software update data 70 are sent from the central processor 216 to the receiving adapter card 20 via DMA.

Figure 5:
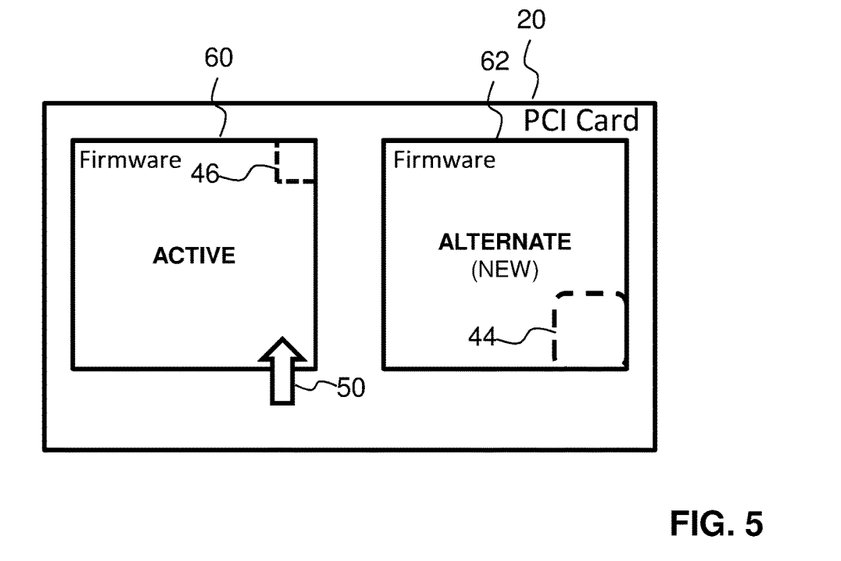
FIG. 5 depicts a flow for updating software in a PCI card according to an embodiment of the invention.

The new software 70 is stored in the reserved alternate memory area 62, see FIG. 5.

Figure 6:
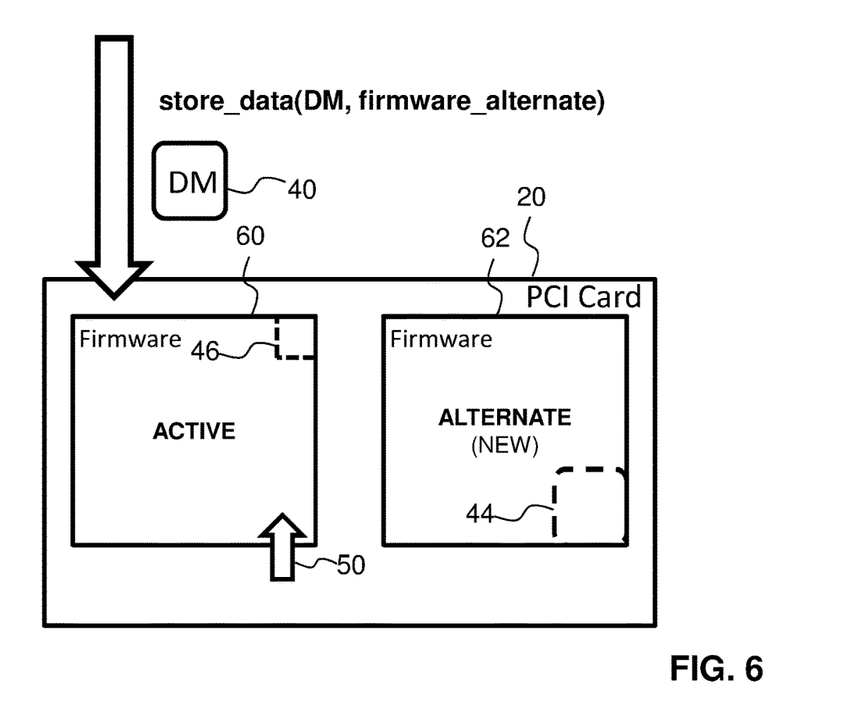
FIG. 6 depicts a flow for updating software in a PCI card according to an embodiment of the invention.
Figure 7:
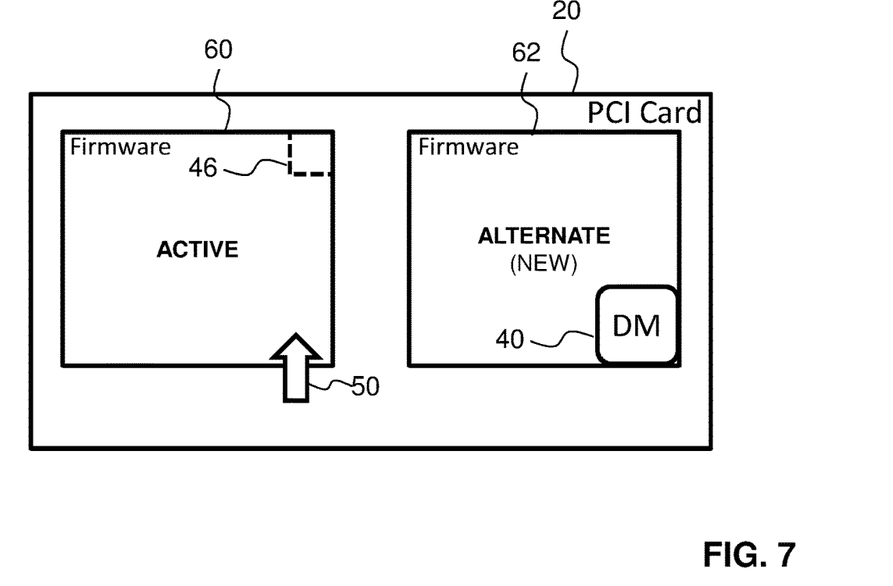
FIG. 7 depicts a flow for updating software in a PCI card according to an embodiment of the invention.

Next, depicted in FIG. 6, the distribution map 40 is loaded to the PCI card 20 by a store_data (DM, firmware_alternate) instruction and stored in the memory space 44 of the reserved alternate memory area 62, as shown in FIG. 7.

Figure 8:
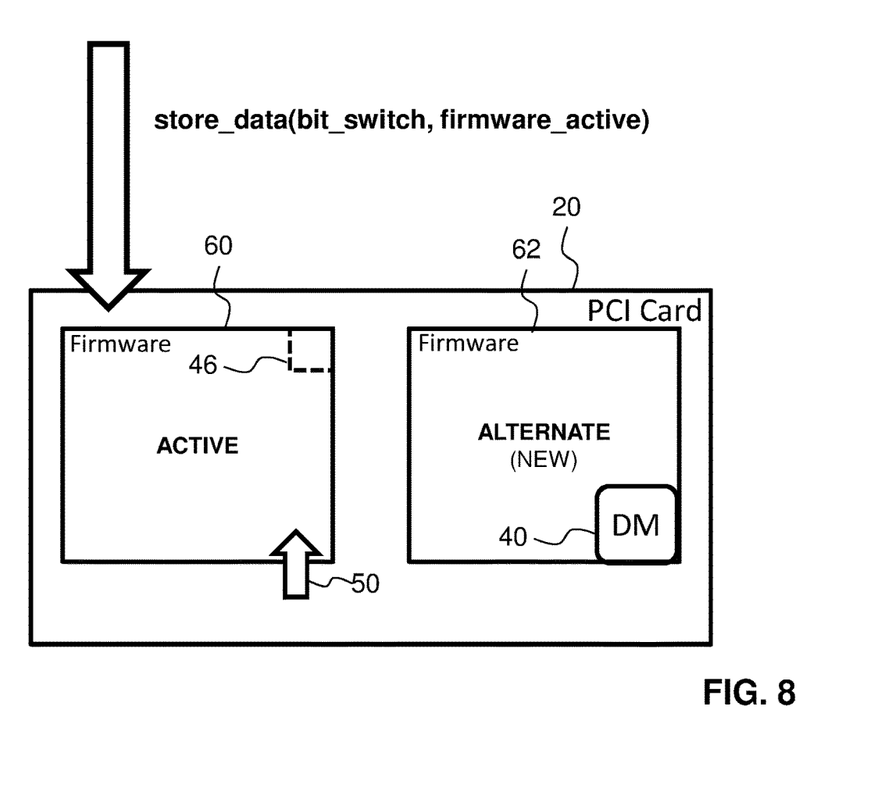
FIG. 8 depicts a flow for updating software in a PCI card according to an embodiment of the invention.
Figure 9:
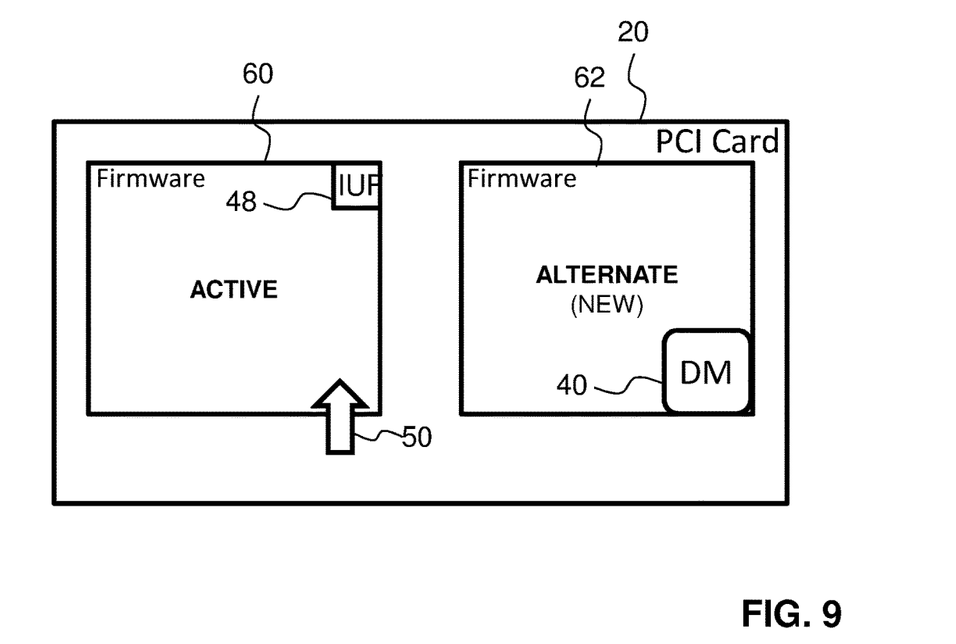
FIG. 9 depicts a flow for updating software in a PCI card according to an embodiment of the invention.

A store_data (bit_switch, firmware_active) instruction initiates the setting of the initiate update flag 48 in the active memory area 60, as depicted in FIGS. 8 and 9.

Figure 10:
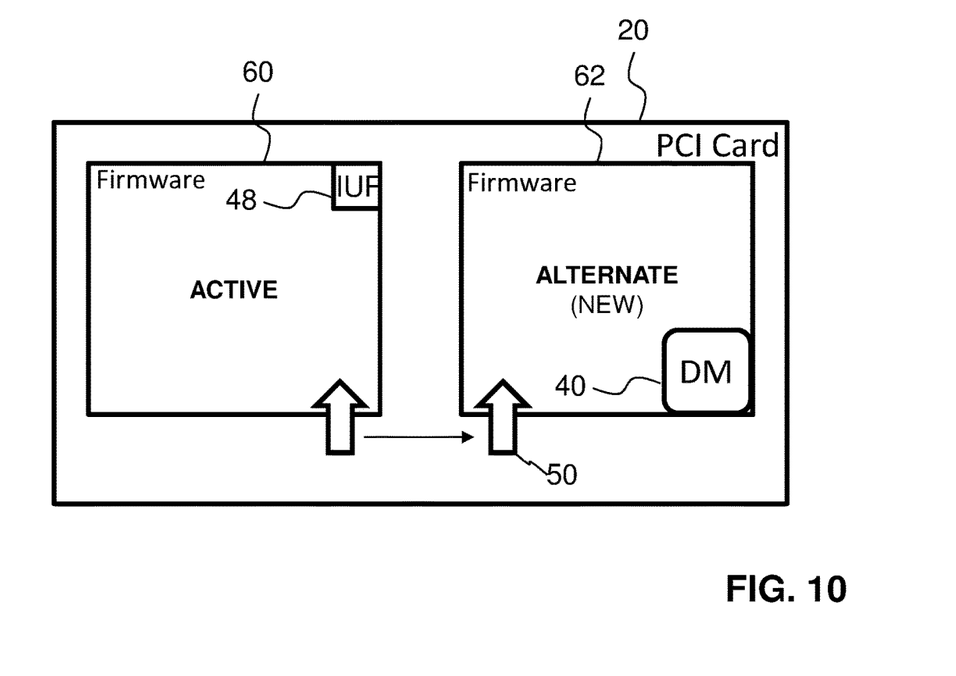
FIG. 10 depicts a flow for updating software in a PCI card according to an embodiment of the invention.
Figure 11:
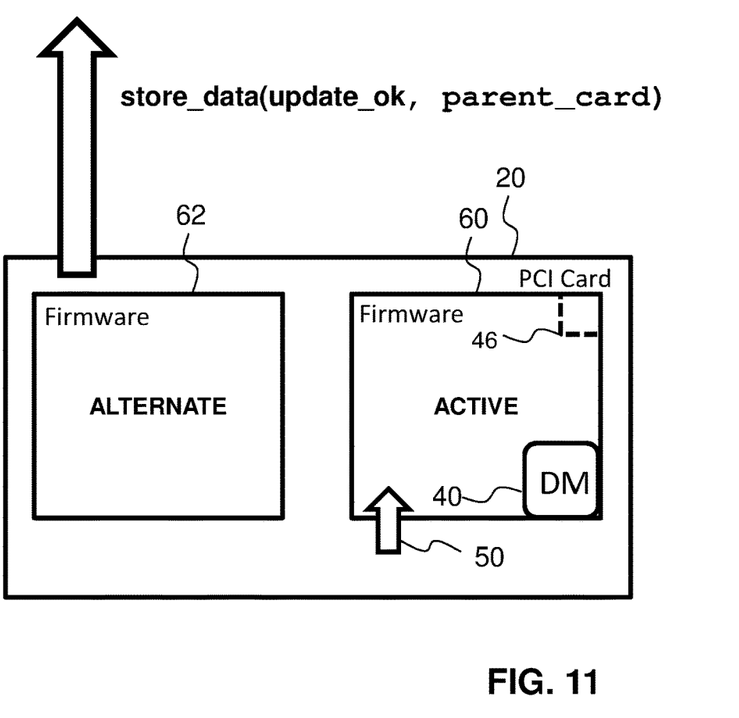
FIG. 11 depicts a flow for updating software in a PCI card according to an embodiment of the invention.

Next, if the PCI card 20 detects that the initiate update flag 48 is set, the runtime pointer 50 is shifted to the reserved alternate memory area 62, which comprises the distribution map 40, as depicted in FIG. 10. Thus, the role of the reserved alternate memory area 62 and the active memory area 60 are switched. This is accomplished by a store_data (update_ok, parent_card) instruction to a calling instance, as shown in FIG. 11, notifying the calling instance about the successful result of the software update operation.

The calling instance is the central processor 216, in case the receiving adapter card 20 is the first one of the adapter cards 20, 22, 24, 26, 30, 32, 34, 36 being updated, or the adapter card 20, 22, 24, 26, 30, 32, 34, 36, from which the software update data 70 were received.

The initiate update flag 48 in the active memory area 60 is cleared, thus reserving the memory space 46 in the active memory area 60 for the initiate update flag 48.

Figure 12:
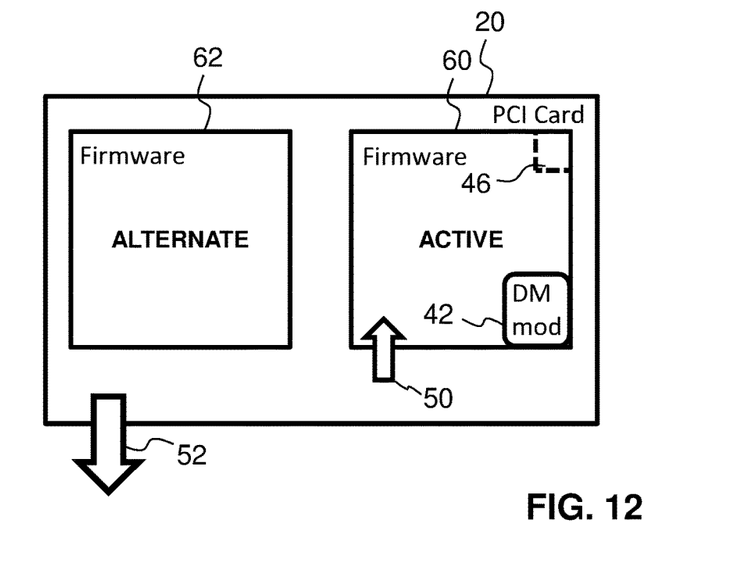
FIG. 12 depicts a flow for updating software in a PCI card according to an embodiment of the invention.

In FIG. 12 the alternate firmware 62 is reset, the distribution map 42 is updated and modified, and the software update for a next PCI card is initiated, marked by arrow 52.

Error handling may be performed for the described software update process. Each adapter card 20 initiates the software update on its child cards 22, 24 first. The adapter card 20 collects update return codes of each child card 22, 24. If a child card 22, 24 does not answer in a certain timeout, this is handled the same way as a bad return code of this child card 22, 24. The adapter card 22, 24 returns the consolidated structure of card identities in the distribution map 40 and matching return code including its own return code to the parent card 20. If the central processor 216 receives any bad return code, it creates a new distribution map 40 committing the already updated adapter cards 20, 22, 24 and cards with unrecoverable bad return codes, e.g. card is not plugged any more. The central processor 216 initiates the software update process based on the new distribution map 40.

Figure 13:
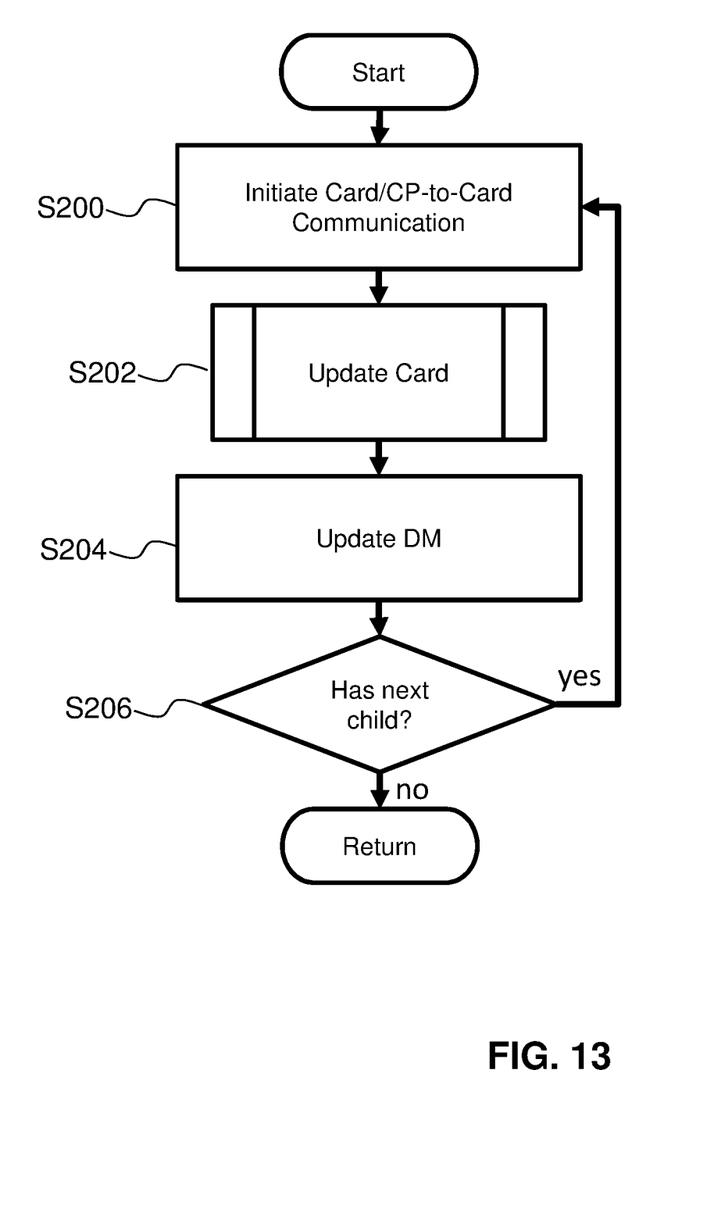
FIG. 13 depicts a high-level flow chart for updating software of PCI cards according to an embodiment of the invention.

FIG. 13 depicts a high-level flow chart for updating software of PCI cards according to an embodiment of the invention. The software update process starts with the first step S200, with an initiate card and central processor 216 to adapter card 20 communication. The adapter card 20 is updated in step S202, followed by an update of the distribution map 40 in step S204. Having accomplished this step, it is checked in step s206, if there is another child, i.e. another adapter card in the tree structure of adapter cards, to be updated. If this is the case, the flow returns to step S200, otherwise the process ends.

Figure 14:
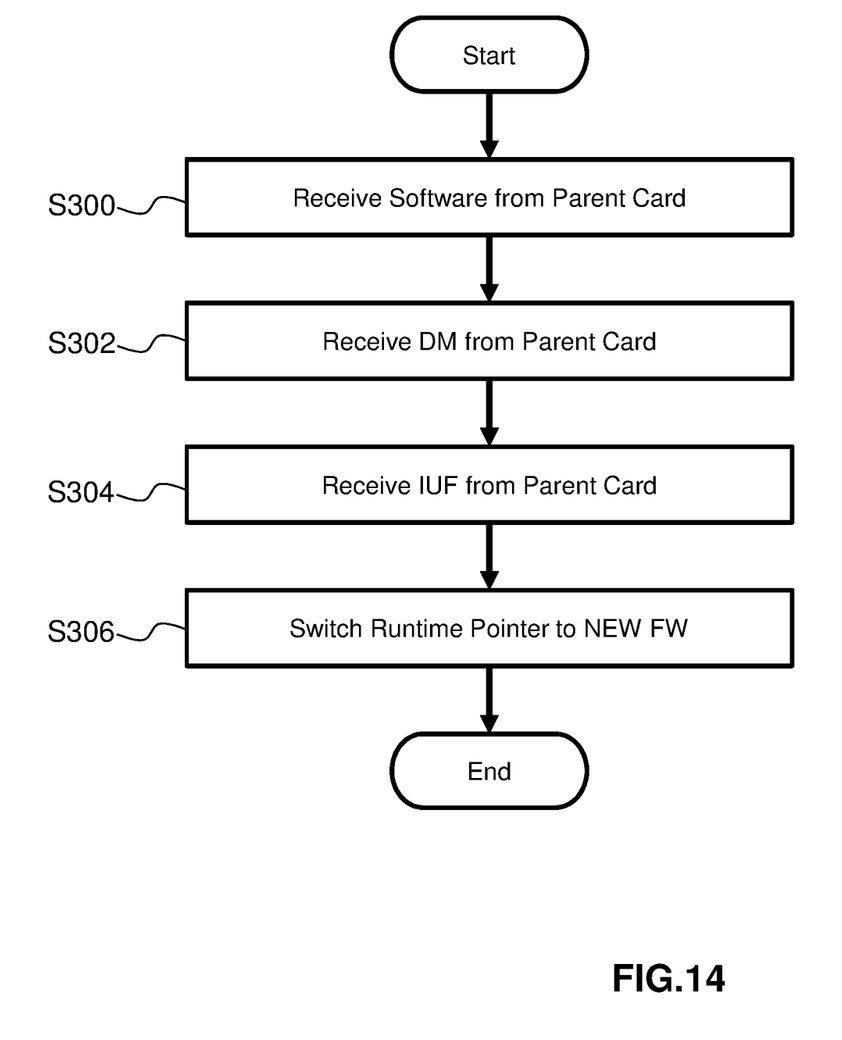
FIG. 14 depicts a flow chart of a sub-process for performing a software update of a single PCI card according to an embodiment of the invention.

FIG. 14 depicts a flow chart of a sub-process for performing a software update of a single PCI card 22 according to an embodiment of the invention. The flow starts with step S300, when the software update data 70 are received by the receiving adapter card 22 from a parent adapter card 20 or the central processor 216. Reference numerals are referred to FIG. 2. Next in step S302 the distribution map 40 is received from the parent adapter card 20 or the central processor 216, followed by step S304, where the initiate update flag 48 is received from the parent adapter card 20. If the software update has been accomplished, the runtime pointer 50 is switched to the new memory area 62 in step S306 in order to mark the memory area 62 as active memory area 60 and the sub-process is ended.

Figure 15:
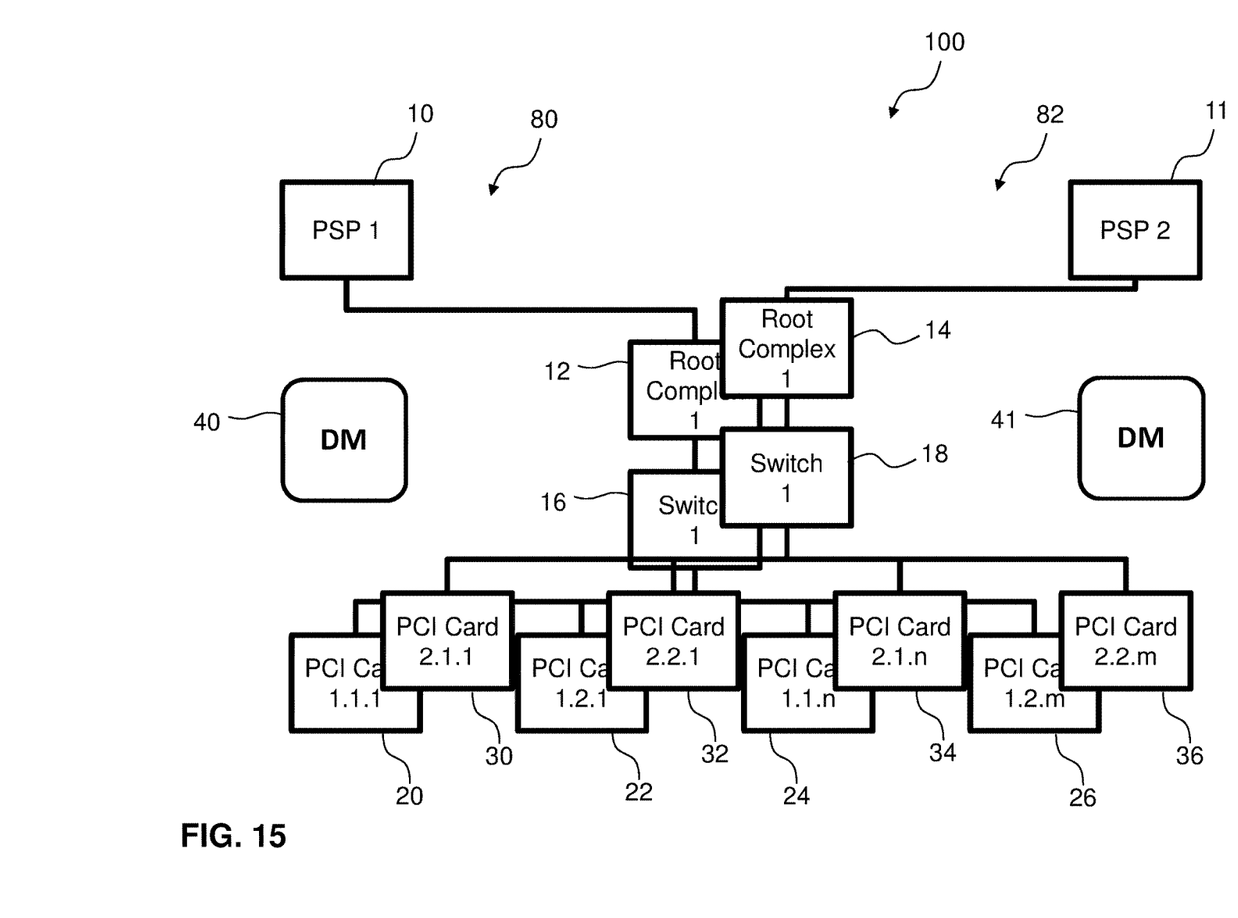
FIG. 15 depicts a setup overview for updating software in PCI cards grouped in redundancy groups according to an embodiment of the invention.

FIG. 15 depicts a setup overview for updating software in PCI cards 20, 22, 24, 26, 30, 32, 34, 36 grouped in redundancy groups 80, 82 according to an embodiment of the invention.

On common computer systems, the firmware may be responsible for IO card virtualization, service, and maintenance. This functionality may be implemented with PCI redundancy groups 80, 82. To protect against system-wide outages at times of failure of PCI support partitions, IO cards may be assigned to redundancy groups 80, 82, where each group 80, 82 may be controlled by one individual PCI support partition 10, 11. To ensure the redundancy is not broken, two distribution maps 40, 41 may be used that are issued one after each other. Thus a software update for redundant adapter cards 20, 22, 24, 26, 30, 32, 34, 36 may be performed at different time steps. Alternatively redundant adapter cards 20, 22, 24, 26, 30, 32, 34, 36 may grouped in the same distribution map 40, 41, but ordered successively in the ordered structure of the distribution map 40, 41. Then the redundant adapter cards 20, 22, 24, 26, 30, 32, 34, 36 may be updated consecutively.

There is a similar configuration of a tree structure, where the adapter cards 20, 22, 24, 26, 30, 32, 34, 36 are arranged as depicted in FIG. 2. The difference is, that now part of the adapter cards 20, 22, 24, 26 are arranged in one redundancy group 80 and another part of the adapter cards 30, 32, 34, 36 are arranged in another redundancy group 82. The software update process may be performed in a similar way to the software update process as described before. In this case a dedicated distribution map 40, 41 is attributed to each redundancy group 80, 82 separately.

Each distribution map 40, 41 may cover PCI cards 20, 22, 24, 26, 30, 32, 34, 36 of one redundancy group 80, 82. When the root complexes 12, 14 support this, the distribution map 40, 41 for one redundancy group 80, 82 may span multiple trees of PCI cards 20, 22, 24, 26, 30, 32, 34, 36.

Figure 16:
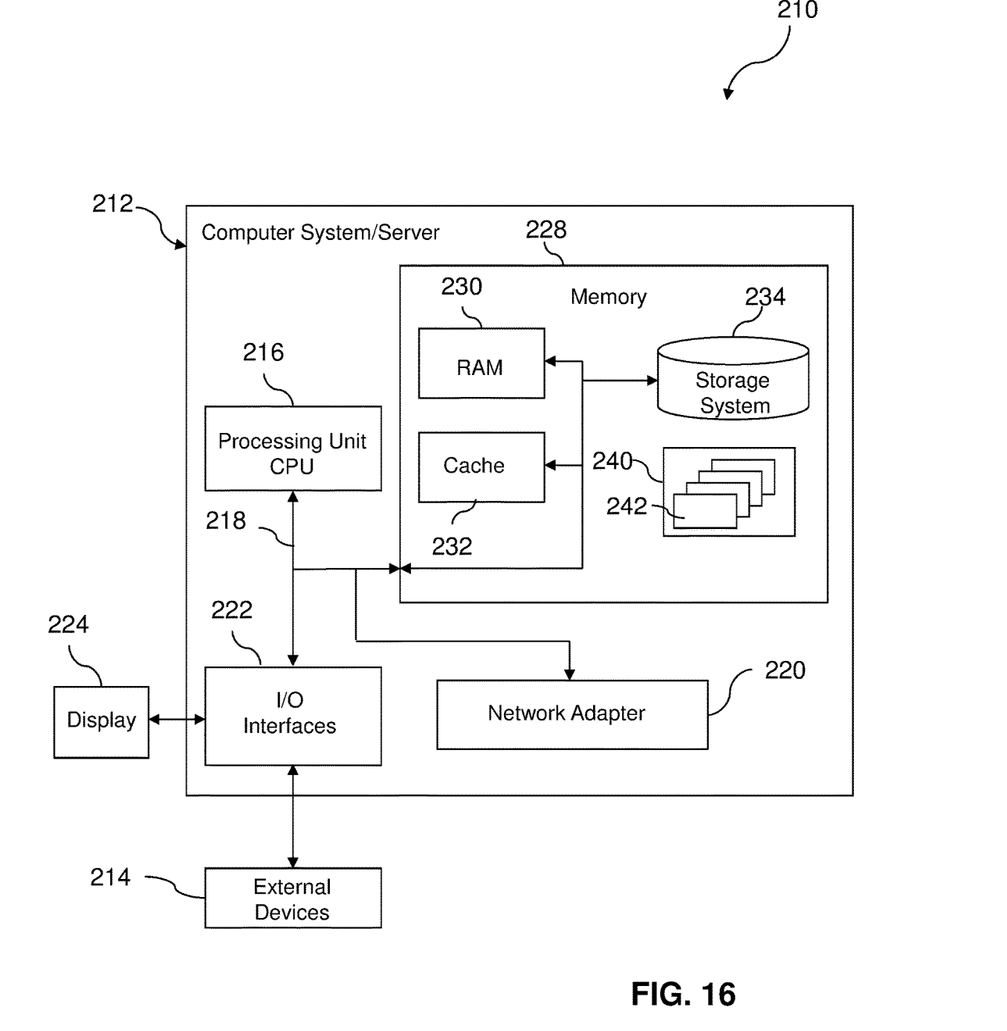
FIG. 16 depicts an example embodiment of a data processing system for executing a method according to the invention.

Referring now to FIG. 16, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive structure of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for updating software in a computer system, the computer system comprising at least a central processor and multiple adapter cards, wherein the adapter cards are attached to a network, the method comprising the central processor generating a distribution map based on configuration data of the network, the distribution map comprising an ordered structure of unique network identifiers of adapter cards that are to be updated with software update data;

the central processor sending the software update data and the distribution map to a receiving adapter card of the adapter cards referenced in the distribution map;

in response to receiving the software update data and the distribution map, the receiving adapter card;

applying the received software update data;

creating at least one modified distribution map by removing network identifiers including the identifier of the receiving adapter card from the distribution map such that the at least one modified distribution map comprises a disjoint subset of network identifiers from the distribution map;

for the at least one modified distribution map sending the received software update data and the modified distribution map to at least one next adapter card in the modified distribution map.

2. The method according to claim 1, further the software being embedded in the adapter cards as firmware.

3. The method according to claim 1, further the next adapter card in the modified distribution map in response to receiving the software update data and the modified distribution map, the next adapter card applying the received software update data;

creating at least one modified distribution map by removing network identifiers including the identifier of the next adapter card from the received modified distribution map such that the modified distribution map comprises a disjoint subset of network identifiers from the received modified distribution map;

for the modified distribution map sending the received software update data and the modified distribution map to at least one next adapter card in the modified distribution map.

4. The method according to claim 1, wherein the adapter cards are PCI cards and/or IO cards.

5. The method according to claim 1, wherein the receiving adapter card which receives the software update data and the distribution map sent from the central processor is the adapter card of the ordered structure of unique network identifiers of adapter cards.

6. The method according to claim 1, further a memory space in the adapter cards being reserved for an initiate update flag.

7. The method according to claim 6, further the adapter cards comprising at least an active memory area and a reserved memory area, wherein the active memory area comprises a memory space for the initiate update flag.

8. The method according to claim 7, further the reserved memory area comprising a memory space for the distribution map.

9. The method according to claim 7, further the active memory area being marked by a runtime pointer.

10. The method according to claim 1, further redundant adapter cards being grouped in redundancy groups, wherein a dedicated distribution map is attributed to each redundancy group, wherein a software update for redundant adapter cards is performed at different time steps.

11. The method according to claim 6, further applying the received software update data in a reserved memory area of the adapter card.

12. The method according to claim 11, further the distribution map being stored in a reserved memory space of the reserved memory area of the adapter card.

13. The method according to claim 12, further the adapter card in response to applying the software update data switching the reserved memory area to an active memory area of the adapter card by switching a runtime pointer from the active memory area to the reserved memory area.

14. The method according to claim 13, further the adapter card in response to switching the reserved memory area to the active memory area reserving a memory space in the active memory area for the initiate update flag.

15. The method according to claim 1, further the adapter card being updated notifying a calling instance about a result of the software update operation.

16. The method according to claim 15, further the calling instance being the central processor, in case the receiving adapter card is a first one of the adapter cards being updated, or the adapter card, from which the software update data were received.

17. The method according to claim 1, further the software update operation being an asynchronous process.

18. The method according to claim 1, further sending the software update data from the central processor to the receiving adapter card via DMA.

19. A computer program product for updating software in a computer system, the computer system comprising at least a central processor and multiple adapter cards, wherein the adapter cards are attached to a network, the computer program product comprising a non-transitory computer readable storage medium having program instructions embodied therewith, the program instructions executable by the computer system to cause the computer system to perform a method comprising:

the central processor generating a distribution map based on configuration data of the network, the distribution map comprising an ordered structure of unique network identifiers of adapter cards that are to be updated with software update data;

the central processor sending the software update data and the distribution map to a receiving adapter card of the adapter cards referenced in the distribution map;

in response to receiving the software update data and the distribution map, the receiving adapter card, applying the received software update data;

creating at least one modified distribution map by removing network identifiers including the identifier of the receiving adapter card from the distribution map such that the at least one modified distribution map comprises a disjoint subset of network identifiers from the distribution map;

for the at least one modified distribution map sending the received software update data and the modified distribution map to at least one next adapter card in the modified distribution map.

20. A data processing system for execution of a data processing program comprising non-transitory computer readable program instructions for performing a method according to claim 1.

\* \* \* \* \*